(12) United States Patent
Liang (10) Patent No.: US 11,947,920 B2
(45) Date of Patent: Apr. 2, 2024

(54) MAN-MACHINE DIALOGUE METHOD AND SYSTEM, COMPUTER DEVICE AND MEDIUM

(71) Applicant: BOE Technology Group Co., Ltd., Beijing (CN)

(72) Inventor: Tianxin Liang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 404 days.

(21) Appl. No.: 17/331,056

(22) Filed: May 26, 2021

(65) Prior Publication Data

US 2022/0083742 A1   Mar. 17, 2022

(30) Foreign Application Priority Data

Sep. 15, 2020   (CN) .......................... 202010966100.5

(51) Int. Cl.
*G06F 40/35*   (2020.01)
*G06F 40/40*   (2020.01)

(52) U.S. Cl.
CPC .............. *G06F 40/35* (2020.01); *G06F 40/40* (2020.01)

(58) Field of Classification Search
CPC ........ G06F 40/40; G06F 40/284; G06F 40/35; G06F 40/295; G06F 16/243; G06F 16/248; G06F 16/3325; G06F 16/3334; G06F 16/3338; G06F 16/9535; G06F 40/216; G06F 40/30; G06F 16/3329; G06F 16/35; G06F 40/279; G06F 16/367; G06F 40/268; G06F 16/3344; G06F 18/2411; G06F 40/44; G10L 15/16; G10L 15/1815; G10L 15/22; G10L 15/1822; G10L 13/027; G10L 13/047; G10L 15/30; G10L 15/197; G10L 2015/225; G10L 2015/226

See application file for complete search history.

(56) References Cited

U.S. PATENT DOCUMENTS

| | | | | |
|---|---|---|---|---|
| 10,678,816 | B2 * | 6/2020 | Peng | G06F 16/22 |
| 2020/0004873 | A1 * | 1/2020 | Chang | G06F 16/31 |
| 2020/0193089 | A1 * | 6/2020 | Huang | G06F 40/30 |
| 2022/0050966 | A1 * | 2/2022 | Yang | G06F 40/295 |
| 2022/0075944 | A1 * | 3/2022 | Du | G06F 40/295 |
| 2022/0130378 | A1 * | 4/2022 | Avijeet | G10L 15/30 |

* cited by examiner

*Primary Examiner* — Abdelali Serrou
(74) *Attorney, Agent, or Firm* — Arch & Lake LLP (57) ABSTRACT

Provided are a man-machine dialogue method and system, computer device and medium. A specific implementation of the method includes: obtaining a current dialogue sentence input by a user; using the current dialogue sentence and a goal type and a goal entity of a preceding dialogue sentence obtained before the current dialogue sentence as an input of a first neural network module of a neural network system, and generating the goal type and the goal entity of the current dialogue sentence by performing feature extraction through the first neural network module; and using the current dialogue sentence, the goal type and the goal entity of the current dialogue sentence and knowledge base data as an input of a second neural network module of the neural network system, and generating a reply sentence by performing feature extraction and classification through the second neural network module.

15 Claims, 2 Drawing Sheets

MAN-MACHINE DIALOGUE METHOD AND SYSTEM, COMPUTER DEVICE AND MEDIUM

CROSS-REFERENCE TO RELATED APPLICATIONS

This application claims priority to Chinese Patent Application No. 202010966100.5, filed on Sep. 15, 2020, the disclosure of which is incorporated herein by reference in its entirety.

TECHNICAL FIELD

The present disclosure relates to the field of computer technologies, and more specifically, to a man-machine dialogue method and system, computer device and computer-readable medium.

BACKGROUND

With a rapid development of mobile Internet and smart terminals, the man-machine dialogue technology is widely applied. For example, major Internet companies have also launched their own smart assistants utilizing a man-machine dialogue function, such as Apple Siri, Google Now, Microsoft Cortana, Facebook M, Baidu Duer and Microsoft Xiaoice, and so on. At present, existing man-machine dialogue methods involve various types of dialogues, such as chitchat dialogues, question answering dialogues, task-based dialogues, etc. However, such types of dialogues are isolated from each other and lack initiative, scalability, and richness, and do not meet usual user conversation habits. The existing man-machine dialogue technologies still need to be continuously developed and improved to be more anthropomorphic, knowledgeable, and capable of implementing more complex tasks.

SUMMARY

The present disclosure is to provide a man-machine dialogue method and system, and a computer device.

A first aspect of the present disclosure provides a man-machine dialogue method, including:
  obtaining a current dialogue sentence input by a user;
  using the current dialogue sentence and a goal type and a goal entity obtained before the current dialogue sentence as an input of a first neural network module of a neural network system, and generating the goal type and the goal entity of the current dialogue sentence by performing feature extraction through the first neural network module; and
  using the current dialogue sentence, the goal type and the goal entity of the current dialogue sentence and knowledge base data as an input of a second neural network module of the neural network system, and generating a reply sentence by performing feature extraction and classification through the second neural network module.

A second aspect of the present disclosure provides a man-machine dialogue system. The system may include a processor and a memory storing a computer program.

The computer program, when executed by the processor, may cause the processor to obtain a current dialogue sentence input by a user; use the current dialogue sentence and a goal type and a goal entity obtained before the current dialogue sentence as an input, and generate the goal type and the goal entity of the current dialogue sentence through feature extraction; and use the current dialogue sentence, the goal type and the goal entity of the current dialogue sentence and knowledge base data as an input, and generate a reply sentence through feature extraction and classification.

A third aspect of the present disclosure provides a computer device, including a memory, a processor, and a computer program stored in the memory and capable of running on the processor. The processor, when executing the program, may implement obtaining a current dialogue sentence input by a user; using the current dialogue sentence and a goal type and a goal entity obtained before the current dialogue sentence as an input of a first neural network module of a neural network system, and generating the goal type and the goal entity of the current dialogue sentence by performing feature extraction through the first neural network module; and using the current dialogue sentence, the goal type and the goal entity of the current dialogue sentence and knowledge base data as an input of a second neural network module of the neural network system, and generating a reply sentence by performing feature extraction and classification through the second neural network module.

It is to be understood that the above general descriptions and detailed descriptions below are only exemplary and explanatory and not intended to limit the present disclosure.

BRIEF DESCRIPTION OF THE DRAWINGS

A specific implementation of the present disclosure will be described in further detail below in conjunction with the accompanying drawings.

DETAILED DESCRIPTION

In order to explain the present disclosure more clearly, the present disclosure will be further described below in conjunction with examples and drawings. Similar components in the drawings are denoted by same reference numerals. Those skilled in the art should understand that content described below is illustrative rather than restrictive, and should not be considered as limiting of a protection scope of the present disclosure.

Figure 1:
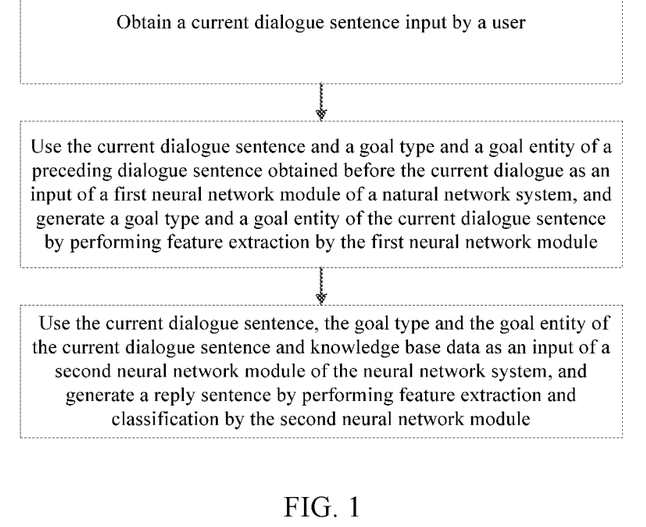
FIG. 1 shows a flowchart of a man-machine dialogue method provided by an example of the present disclosure.

As shown in FIG. 1, an example of the present disclosure provides a man-machine dialogue method, including:
  obtaining a current dialogue sentence input by a user; and
  using the current dialogue sentence and knowledge base data as an input of a neural network system, and generating a reply sentence by performing feature extraction and classification through the neural network system, where the reply sentence is a chitchat sentence, an answer sentence or a recommendation sentence.

In some examples, before using the current dialogue sentence and knowledge base data as an input of a neural network system, and generating a reply sentence by performing feature extraction and classification through the neural network system, the method further includes:

obtaining the neural network system by performing training on training data, where the training data includes dialogue sequences, candidate reply sentences, the knowledge base data, and a target recommendation sequence, and the dialogue sequences include a chit-chat dialogue, a question answering dialogue, and a recommendation dialogue.

It should be understood that the man-machine dialogue method provided in this example is a man-machine dialogue method based on the neural network system. As a machine learning model, the neural network system may be divided into two stages: a training stage and a usage stage.

The training stage is used to determine, according to the training data, parameters of each network or model in the neural network system by maximizing a likelihood function on the training data through a back-propagation algorithm or a stochastic gradient descent algorithm. The usage stage is used to generate the reply sentence and return it to the user by having the current dialogue sentence input by the user as the input of the neural network system and performing calculations by the neural network system based on a knowledge base which has already been constructed.

In order to facilitate understanding, the training stage is introduced first.

First, the training data is constructed. The training data includes:

a dialogue sequence $ContextX_0$: $\{ContextX_{0,1}, ContextX_{0,2}, ContextX_{0,3} \ldots\}$;
a candidate reply sentence $Y_0$: $\{Y_{0,1}, Y_{0,2}, Y_{0,3} \ldots\}$;
knowledge base data (Subject, Relation, Object): $\{SRO_1, SRO_2, SRO_3 \ldots\}$; and
a goal recommendation sequence $GT_0$, $GE_0$: $\{[GT_{0,1}, GE_{0,1}], [GT_{0,2}, GE_{0,2}], [GT_{0,3}, GE_{0,3}] \ldots\}$, where $GT_0$ refers to Goal-Type$_0$, that is Goal-Type, and GE refers to Goal-Entity$_0$, that is, Goal-Entity).

The knowledge base is generated on the basis of some "facts". The knowledge base includes records or "tuples". Specifically, the knowledge base may be obtained from the Internet. In this example, the knowledge base data may be specifically composed of multiple triples. Web pages may be crawled from encyclopedia knowledge sites such as Baidu Encyclopedia, Interactive Encyclopedia, and Douban, and the structured triple may be obtained by analyzing a table in the web page. After further processing including denoising, merging and so on, multiple triples are extracted to form the knowledge base.

In a specific implementation, as an example, the man-machine dialogue method provided in this example is applied to a display device to achieve painting recommendation through a man-machine dialogue process.

For example, the dialogue may be:

"User: Hello.
Display device: Hello, Xiao Ming.
User: Do you know who painted the water lily?
Display device: I know it is Monet.
Display device: Monet is also a French painter.
User: What other works does he have?
Display device: Monet also painted Impression Sunrise, Haystacks, etc. Would you like to see it?
User: I want to see it.
Display device: Please enjoy the Impression Sunrise."

In this case, the dialogue sequence $ContextX_0$ includes, for example, $ContextX_{0,1}$ "'Hello', 'Hello, Xiao ming', 'Do you know who painted the water lily?', 'I know, it's Monet' or the like; the candidate reply sentence $Y_0$ includes, for example, $Y_{0,1}$ "I know, it is Monet", $Y_{0,2}$ "Monet is also a French painter", or the like; the knowledge base data Subject, Relation, Object includes, for example, $SRO_1$ "Monet, nationality, France", $SRO_2$ "Monet, birthday, Nov. 14, 1840", $SRO_3$ "Monet, painting school, impressionism", $SRO_4$ "Monet, Masterpiece, Impression Sunrise", $SRO_5$"Monet, Masterpiece, Haystack", $SRO_6$ "Monet, Masterpiece, Water Lily", $SRO_7$ "Monet, Masterpiece, Rouen Cathedral", etc; and the goal recommendation sequence Goal-Type$_0$, Goal-Entity$_0$ includes, for example: $[GT_{0,1}, GE_{0,1}]$ "[QA, Monet]", $[GT_{0,2}, GE_{0,2}]$ "[Painting recommendation, Monet]", $[GT_{0,3}, GE_{0,3}]$ "[painting on demand, Monet]" etc.

Figure 2:
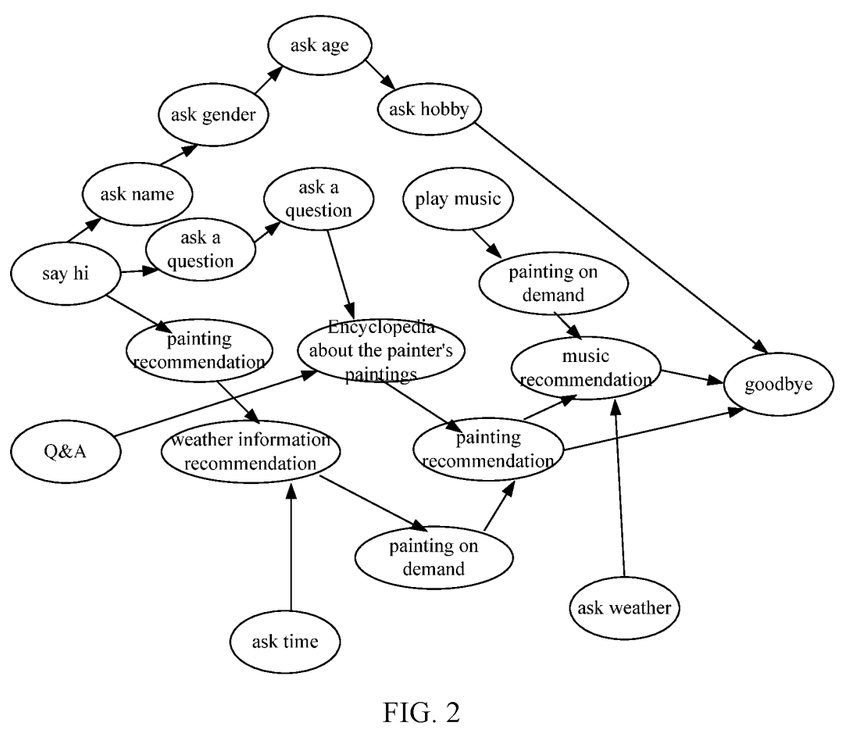
FIG. 2 shows an example diagram of dialog logic.

In the example, the realization of the man-machine dialogue logic is shown in FIG. 2, which provides guidance for the goal recommendation sequence.

Figure 3:
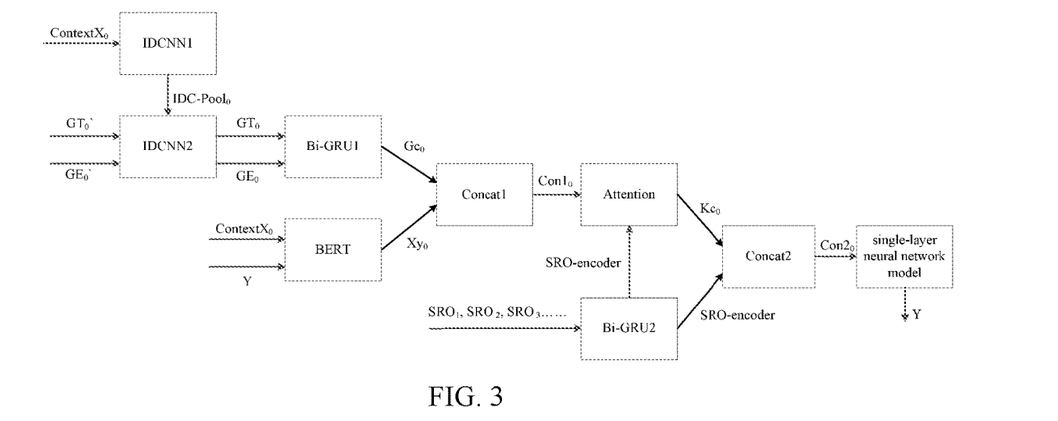
FIG. 3 shows a schematic diagram of a training process of a neural network system.

As shown in FIG. 3, a structure and training process of the neural network system are introduced below.

In some examples, obtaining the neural network system by performing training on training data includes:

using the user dialogue sentence in the dialogue sequence in the training data as $ContextX_0$, using the goal type $GT_0'$ and the goal entity $GE_0'$ of a preceding dialogue sentence obtained before the user dialogue sentence $ContextX_0$ as an input of a first neural network module of the neural network system, generating, by performing the feature extraction through the first neural network module, the goal type $GT_0$ and the goal entity $GE_0$ of the user dialogue sentence $ContextX_0$;

using the user dialogue sentence $ContextX_0$, the goal type $GT_0$ and the goal entity $GE_0$ of the user dialogue sentence $ContextX_0$, and the knowledge base data $\{SRO_1, SRO_2, SRO_3 \ldots\}$ as an input of a second neural network module of the neural network system, and generating a reply sentence Y by performing feature extraction and classification through the second neural network module.

Further, in some examples, using the user dialogue sentence in the dialogue sequence in the training data as $ContextX_0$, using the goal type $GT_0'$ and the goal entity $GE_0'$ of a preceding dialogue sentence obtained before the user dialogue sentence $ContextX_0$ as an input of a first neural network module of the neural network system, and generating, by performing the feature extraction through the first neural network module, the goal type $GT_0$ and the goal entity $GE_0$ of the user dialogue sentence $ContextX_0$, includes:

In response to determining that the user dialogue sentence $ContextX_0$ is an initial dialogue sentence, using the user dialogue sentence $ContextX_0$, a preset goal type and a preset goal entity as the input of the first neural network module of the neural network system, and generating, by performing the feature extraction through the first neural network module, the goal type $GT_0$ and the goal entity $GE_0$ of the user dialogue sentence $ContextX_0$.

Further, in some examples, using the user dialogue sentence in the dialogue sequence in the training data as $ContextX_0$, using a goal type $GT_0'$ and a goal entity $GE_0'$ of the preceding dialogue sentence before the user dialogue sentence $ContextX_0$ as the input of the first neural network module of the neural network system, and generating, by performing the feature extraction through the first neural network module, the goal type $GT_0$ and the goal entity $GE_0$ of the user dialogue sentence $ContextX_0$, includes:

using the user dialogue sentence $ContextX_0$ as an input of a first iteration dilated convolutions neural network (IDCNN) model 1 of the first neural network module, and generating, by performing the feature extraction through the first iteration dilated convolutions neural network model IDCNN1, a first vector IDC-Pool$_0$ representing whether a current dialogue goal is completed; in some examples, the first vector IDC-Pool$_0$ representing whether the current dialogue goal is completed is further generated by a pooling layer of the IDCNN1, which is different from a conventional classification output in that only the pooled information IDC-pool$_0$ is used as the output by the IDCNN1, where the pooled information IDC-pool$_0$ represents whether the current dialogue goal is completed (for example, whether the user dialogue sentence ContextX$_0$ expresses text semantics representing whether the current dialogue goal is completed, such as "goodbye", etc.), and may be represented by a 30-dimensional vector;

using the first vector IDC-Pool$_0$, the goal type GT$_0$' and the goal entity GE$_0$' of the preceding dialogue sentence before the user dialogue sentence ContextX$_0$ as an input of a second iteration dilated convolutions neural network model IDCNN2 of the first neural network module, and generating the GT$_0$ and the goal entity GE$_0$ of the user dialogue sentence ContextX$_0$ by performing the feature extraction through the IDCNN2; in some examples, the goal type GT$_0$ and the goal entity GE$_0$ of the user dialogue sentence ContextX$_0$ is further generated by a fully connected layer of the IDCNN2; in a specific example, the first vector IDC-Pool$_0$ and the goal type GT$_0$' and the goal entity GE$_0$' of the preceding dialogue sentence before the user dialogue sentence ContextX$_0$ are converted into an embedding vector and input to the IDCNN2, and the fully connected layer of the IDCNN2 outputs the goal type GT$_0$ and the goal entity GE$_0$ of the user dialogue sentence ContextX$_0$ by label classification, and the IDCNN1 and the IDCNN2 are linked together and then trained in an end-to-end manner, and finally, the fully connected layer of the IDCNN2 outputs the goal type GT$_0$ and the goal entity GE$_0$ of the user dialogue sentence ContextX$_0$.

Further, in some examples, using the user dialogue sentence ContextX$_0$, the goal type GT$_0$ and the goal entity GE$_0$ of the user dialogue sentence ContextX$_0$ and the knowledge base data{SRO$_1$, SRO$_2$, SRO$_3$ . . . } as the input of the second neural network module of the neural network system, and generating the reply sentence Y by performing the feature extraction and classification through the second neural network module, includes:

the user dialogue sentence ContextX$_0$ and the back-propagated reply sentence Y being input to a natural language processing model of the second neural network module, and encoded by the natural language processing model to extract semantics for generating a second vector Xy$_0$; in some examples, the natural language processing model adopts a BERT (Bidirectional Encoder Representations from Transformers) model, and the encoder of the BERT model encodes the input user dialogue sentence ContextX$_0$ and the back-propagated reply sentence Y to extract semantics for generating the second vector Xy$_0$;

the goal type GT$_0$ and the goal entity GE$_0$ of the user dialogue sentence ContextX$_0$ being input to a first Bi-GRU (Bi-directional Gated Recurrent Unit) model 1 of the second neural network module, and encoded by the first Bi-directional Gated Recurrent Unit model Bi-GRU1 for aligning a vector in length to generate a third vector Gc$_0$;

combining the second vector Xy$_0$ and the third vector Gc$_0$ to obtain a fourth vector Con1$_0$; in a specific example, the second vector Xy$_0$ and the third vector Gc$_0$ are combined by a first concat module Concat1 to obtain the fourth vector Con1$_0$;

the knowledge base data SRO$_1$, SRO$_2$, SRO$_3$ . . . being input to a second Bi-directional Gated Recurrent Unit model Bi-GRU2 of the second neural network module, and encoded by the Bi-GRU2 for aligning a vector in length to generate a fifth vector SRO-encoder;

performing an attention mechanism operation on the fourth vector Con1$_0$ and the fifth vector SRO-encoder to obtain a sixth vector Kc$_0$; in a specific example, the attention mechanism operation is performed on the fourth vector Con1$_0$ and the fifth vector SRO-encoder by an attention mechanism operation module Attention to obtain the sixth vector Kc$_0$, and the attention mechanism operation module Attention may perform a dot multiplication operation on the input fourth vector Con1$_0$ and the fifth vector SRO-encoder to achieve fusion and obtain the sixth vector Kc$_0$;

combining the fifth vector SRO-encoder and the sixth vector Kc$_0$ to obtain a seventh vector Con2$_0$; in a specific example, the fifth vector SRO-encoder and the sixth vector Kc$_0$ are combined by a second concat module Concat2 to obtain the seventh vector Con2$_0$;

the seventh vector Con2$_0$ being input to a single-layer neural network model of the second neural network module, and classified by the single-layer neural network model to generate the reply sentence Y; in a specific example, the single-layer neural network model compares the seventh vector Con2$_0$ with a candidate reply Y$_0$ to obtain a most proximate reply sentence Y.

Figure 4:
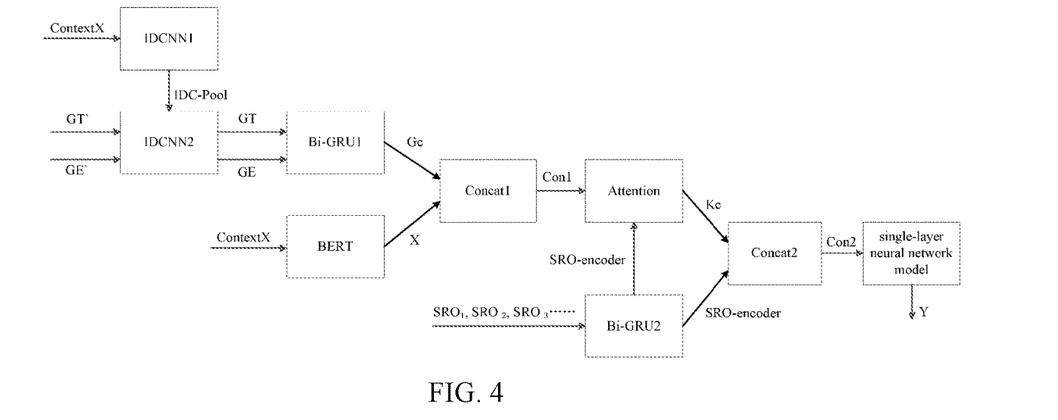
FIG. 4 shows a schematic diagram of a use process of a neural network system.

The training stage of the neural network system is described in detail above. A principle of the usage stage is similar to that of the training stage, as shown in FIG. 4. The use process is described below.

In some examples, as shown in FIG. 4, using the current dialogue sentence and the knowledge base data as the input of the neural network system, and generating the reply sentence by performing the feature extraction and classification through the neural network system, includes:

using the current dialogue sentence as ContextX, using a goal type GT and a goal entity GE' of a preceding dialogue sentence obtained before the current dialogue sentence ContextX as an input of a first neural network module of the neural network system, and generating, by performing the feature extraction through the first neural network module, a goal type GT and a goal entity GE of the current dialogue sentence ContextX; and using the current dialogue sentence ContextX, the goal type GT and the goal entity GE of the current dialogue sentence ContextX and the knowledge base data{SRO$_1$, SRO$_2$, SRO$_3$ . . . } as an input of a second neural network module of the neural network system, and generating a reply sentence Y by performing feature extraction and classification through the second neural network module.

Further, in some examples, using the current dialogue sentence as ContextX, using a goal type GT and a goal entity GE' of a preceding dialogue sentence obtained before the current dialogue sentence ContextX as an input of a first neural network module of the neural network system, and generating a goal type GT and a goal entity GE of the current dialogue sentence ContextX by performing the feature extraction through the first neural network module, includes:

in response to determining that the current dialogue sentence ContextX is an initial dialogue sentence, using the current dialogue sentence ContextX, a preset goal type and a preset goal entity as the input of the first neural network module of the neural network system, and generating, by performing the feature extraction through the first neural network module, the goal type GT and the goal entity GE of the current dialogue sentence ContextX.

Further, in some examples, using the current dialogue sentence ContextX, a goal type GT' and a goal entity GE' of a preceding dialogue sentence obtained before the current dialogue sentence ContextX as an input of a first neural network module of the neural network system, and generating, by performing the feature extraction through the first neural network module, a goal type GT and a goal entity GE of the current dialogue sentence ContextX, includes:

using the current dialogue sentence ContextX as an input of a first iteration dilated convolutions neural network model IDCNN1 of the first neural network module, and generating, by performing feature extraction through the IDCNN1, a first vector IDC-Pool representing whether a current dialogue goal is completed; in some examples, the first vector IDC-Pool representing whether the current dialogue goal is completed is further generated by a pooling layer of the IDCNN1;

using the first vector IDC-Pool and the goal type GT' and the goal entity GE' of the preceding dialogue sentence obtained before the current dialogue sentence ContextX as an input of a second iteration dilated convolutions neural network model IDCNN2 of the first neural network module, and generating, by performing the feature extraction through the IDCNN2, the goal type GT and the goal entity GE of the current dialogue sentence ContextX; in some examples, the goal type GT and the goal entity GE of the current dialogue sentence ContextX is further generated by a fully connected layer of the IDCNN2.

In some examples, using the current dialogue sentence ContextX, the goal type GT and the goal entity GE of the current dialogue sentence ContextX and the knowledge base data{$SRO_1$, $SRO_2$, $SRO_3$ . . . } as the input of the second neural network module of the neural network system and generating the reply sentence Y by performing the feature extraction and classification through the second neural network module, includes:

the current dialogue sentence ContextX being input to a natural language processing model of the second neural network module, and encoded by the natural language processing model to extract semantics for generating a second vector X; in a specific example, the natural language processing model adopts the BERT model, and the encoder of the BERT model encodes the input current dialogue sentence ContextX to extract semantics for generating the second vector X;

the goal type GT and the goal entity GE of the current dialogue sentence ContextX being input to a first Bi-directional Gated Recurrent Unit model Bi-GRU1 of the second neural network module, and encoded by the Bi-GRU1 for aligning a vector in length to generate a third vector Gc;

combining the second vector X and the third vector Gc to obtain a fourth vector Con1; in a specific example, the second vector X and the third vector Gc are combined by the first concat module Concat1 to obtain the fourth vector Con1;

the knowledge base data $SRO_1$, $SRO_2$, $SRO_3$ . . . being input to a second Bi-directional Gated Recurrent Unit model Bi-GRU2 of the second neural network module, and encoded by the Bi-GRU2 for aligning a vector in length to generate a fifth vector SRO-encoder;

performing an attention mechanism operation on the fourth vector Con1 and the fifth vector SRO-encoder to obtain a sixth vector Kc; in a specific example, the attention mechanism operation is performed on the fourth vector Con1 and the fifth vector SRO-encoder by the attention mechanism operation module Attention to obtain the sixth vector Kc, and the attention mechanism operation module Attention may perform a dot multiplication operation on the input fourth vector Con1 and the fifth vector SRO-encoder to achieve fusion and obtain the sixth vector Kc;

combining the fifth vector SRO-encoder and the sixth vector Kc to obtain a seventh vector Con2; in a specific example, the fifth vector SRO-encoder and the sixth vector Kc are combined by the second concat module Concat2 to obtain the seventh vector Con2; and the seventh vector Con2 being input to a single-layer neural network model of the second neural network module, and classified by the single-layer neural network model to generate the reply sentence Y and return it to the user.

In summary, the man-machine dialogue method provided by the example may fuse various types of dialogues by the neural network, so as to actively and naturally guide the man-machine dialogues from non-recommendation dialogues such as chitchat dialogues, question answering dialogues, task-based dialogues to recommendation dialogues, and fuse the knowledge base data naturally into the dialogue; and the technical solution may accurately generate and output to the user the reply sentences including chitchat sentences, answering sentences and recommendation sentences by the neural network, and then realize the recommendation goal through one or more dialogue interactions in time and accurately on the basis of the knowledge base data and the user interest obtained by analyzing the dialogue sentences input by the user, which may enhance the initiative, scalability and richness of the man-machine dialogue, thereby enhancing the user experience.

Another example of the present disclosure provides a man-machine dialogue system including an obtaining module and a neural network system.

The obtaining module is configured to obtain a current dialogue sentence input by a user.

The neural network system is configured to: use the current dialogue sentence and knowledge base data as an input, and generate a reply sentence through feature extraction, where the reply sentence is a chitchat sentence, an answer sentence or a recommendation sentence.

In some examples, the neural network system includes a first neural network module and a second neural network module.

The first neural network module is configured to: use the current dialogue sentence and a goal type and a goal entity of a preceding dialogue sentence obtained before the current dialogue sentence as an input; generate a goal type and a goal entity of the current dialogue sentence through feature extraction.

The second neural network module is configured to: use the current dialogue sentence, the goal type and the goal entity of the current dialogue sentence and the knowledge base data as an input; and generate the reply sentence through feature extraction and classification.

In some examples, the first neural network module is configured to: in response to the current dialogue sentence being an initial dialogue sentence, use the current dialogue sentence and a preset goal type and a preset goal entity as the input, and generate, through feature extraction, the goal type and the goal entity of the current dialogue sentence.

In some examples, the first neural network module includes:
- a first iteration dilated convolutions neural network model IDCNN1, configured to use the current dialogue sentence as an input, generate, by performing feature extraction to a first vector, IDC-Pool representing whether a current dialogue goal is completed; and
- a second iteration dilated convolutions neural network model IDCNN2, configured to: use the first vector IDC-Pool and the goal type and the goal entity of the preceding dialogue sentence obtained before the current dialogue sentence as an input; and generate the goal type and the goal entity of the current dialogue sentence through feature extraction.

In some examples, the IDCNN1 is configured to generate the first vector IDC-Pool representing whether the current dialogue goal is completed by a pooling layer thereof; and the IDCNN2 is configured to generate the goal type and the goal entity of the current dialogue sentence by a fully connected layer thereof.

In some examples, the second neural network module includes:
- a natural language processing model, configured to: use the current dialogue sentence as an input, encode the current dialogue sentence to extract semantics so as to generate a second vector Xy; in a specific example, the natural language processing model is a BERT model;
- a first Bi-directional Gated Recurrent Unit model Bi-GRU1, configured to: use the goal type and the goal entity of the current dialogue sentence as an input, encode the goal type and the goal entity of the current dialogue sentence to generate a third vector Gc;
- a first concat module Concat1, configured to combine the second vector Xy and the third vector Gc to obtain a fourth vector Con1;
- a second Bi-directional Gated Recurrent Unit model Bi-GRU2, configured to use the knowledge base data as an input, and encode the knowledge base data to generate a fifth vector Kg-encoder;
- an attention mechanism operation module Attention, configured to perform an attention mechanism operation on the fourth vector Con1 and the fifth vector Kg-encoder to obtain a sixth vector Kc;
- a second concat module Concat2, configured to combine the fifth vector Kg-encoder and the sixth vector Kc to obtain a seventh vector Con2; and
- a single-layer neural network model, configured to use the seventh vector Con2 as an input, generate the reply sentence Y by performing classification on the Con2.

It should be noted that a principle and a workflow of the man-machine dialogue system provided in the example are similar to the above-mentioned man-machine dialogue method, and the relevant parts may be referred to the above description, which will not be repeated here.

The man-machine dialogue system provided by the example may be implemented by a computer device, which may be various electronic devices, including but not limited to personal computers, tablet computers, servers, and so on.

In addition, the man-machine dialogue system provided by the example may also be implemented by mutually cooperating terminal devices and servers. For example, after receiving a dialogue sentence input by a user in voice or in text, the tablet computer sends it to the server. The server deploying the neural network system generates the reply sentence and sends it to the tablet computer, which is played or displayed to the user by the tablet computer. The tablet computer and the server communicate via a network which may include various connection types, such as wired communication links, wireless communication links, or fiber optic cables. A specific implementation of the "receiving" mentioned above corresponds to a way in which the user uses the tablet computer. For example, if the user uses a keyboard or a touch screen to input the dialogue sentence to the tablet computer, the tablet computer receives the dialogue sentence input by the user; for example, if the user inputs the dialogue sentence through mouse click, keyboard operation, touch and other methods on the application GUI interface of the tablet computer, and the tablet computer captures these operations to receive the dialogue sentence input by the user; for example, if the user inputs the dialogue sentence in voice, the tablet computer receives the dialogue sentence input by the user in a voice-to-text method.

Figure 5:
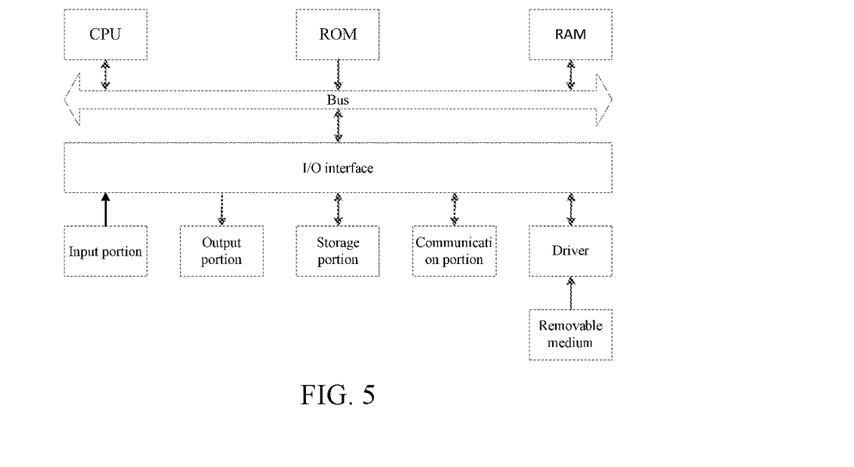
FIG. 5 shows a schematic diagram illustrating configurations of a computer system that implements a man-machine dialogue system provided by an example of the present disclosure.

As shown in FIG. 5, it is a computer system suitable for implementing the man-machine dialogue system provided by the above examples, and includes a central processing module (CPU), which can perform various appropriate actions and processes based on a program stored in a read-only memory (ROM) or a program loaded from the storage part into a random access memory (RAM). In RAM, various programs and data necessary for the operations of the computer system are also stored. The CPU, ROM and RAM are connected through the bus. The input/input (I/O) interface is also connected to the bus.

The following components are connected to the I/O interface: an input portion including a keyboard, a mouse, etc.; an output portion including such as a quid crystal display (LCD) and a speaker; a storage portion including a hard disk, etc.; and a communication portion including a network interface card such as a LAN card, a modem, etc. The communication portion performs communication processing via a network such as the Internet. The drive is also connected to the I/O interface as needed. Removable medium, such as magnetic disks, optical disks, magneto-optical disks, semiconductor memories, etc., are installed on the drive as needed, so that the computer program read out therefrom is installed into the storage portion as needed.

In particular, according to this example, the processes described in the above flowchart can be implemented as a computer software program. For example, this example includes a computer program product that includes a computer program tangibly contained on a computer-readable medium, and the above computer program includes program codes for performing the method shown in the flowchart. In such an example, the computer program may be downloaded from the network through the communication portion and installed, and/or installed from the removable medium.

The flowcharts and schematic diagrams in the drawings illustrate possible implementations of architecture, functions and operations of the system, method and computer program product of this example. In this regard, each block in the flowchart or schematic diagram may represent a module, a program segment, or a portion of codes, and the above-mentioned module, program segment, or the portion of codes contains one or more executable instructions for implementing specified logical functions. It should also be noted that, in some alternative implementations, the functions noted in the blocks may occur out of the order noted in the drawings. For example, two consecutive blocks can actually be executed in parallel, and sometimes they can also be executed in a reverse order, depending on the functions involved. It should also be noted that each block in the schematic and/or flowchart, and a combination of blocks in the schematic and/or flowchart, can be implemented with a dedicated hardware-based system that performs the specified function or operation, or with a combination of a dedicated hardware and computer instructions.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

As another aspect, this example also provides a non-volatile computer storage medium. The non-volatile computer storage medium may be the non-volatile computer storage medium included in the above-described device in the foregoing examples, or may be a non-volatile computer storage medium that exists alone and is not installed in the terminal. The non-volatile computer storage medium stores one or more programs. When the one or more programs are executed by a device, the device is made to: obtain a current dialogue sentence input by a user; and use the current dialogue sentence and knowledge base data as an input of a neural network system, and perform feature extraction and classification by the neural network system to generate a reply sentence, wherein the reply sentence is a chat sentence, an answer sentence or a recommendation sentence.

It should be noted that in the description of the present disclosure, relational terms such as first and second are only used to distinguish one entity or operation from another entity or operation, and do not necessarily require or imply any such actual relationship or order between these entities or operations. Further, the terms "include", "contain" or any other variants thereof are intended to cover non-exclusive inclusions, so that a process, method, article or device that includes a series of elements includes not only those elements, but also other elements that are not explicitly listed, or include elements inherent to this process, method, article, or device. Without more restrictions, the element defined by the sentence "include a . . . " does not exclude that there are other identical elements in the process, method, article or device that includes the element.

Apparently, the above-mentioned examples of the present disclosure are only examples for clearly illustrating the present disclosure, rather than limiting the examples of the present disclosure. For those ordinary skilled in the art, on the basis of the above description, other different forms of changes or variations can also be made, and it is impossible to exhaustively list all the examples here. Any obvious change or variation derived from the technical solutions of the present disclosure is still within the protection scope of the present disclosure.

What is claimed is:

1. A man-machine dialogue method, comprising:
obtaining a current dialogue sentence input by a user;
using the current dialogue sentence and a goal type and a goal entity obtained before the current dialogue sentence as an input of a first neural network module of a neural network system, and generating the goal type and the goal entity of the current dialogue sentence by performing feature extraction through the first neural network module; and
using the current dialogue sentence, the goal type and the goal entity of the current dialogue sentence and knowledge base data as an input of a second neural network module of the neural network system, and generating a reply sentence by performing feature extraction and classification through the second neural network module,
wherein using the current dialogue sentence, the goal type and the goal entity of the current dialogue sentence and knowledge base data as an input of a second neural network module of the neural network system, and generating a reply sentence by performing feature extraction and classification through the second neural network module, comprises:
the current dialogue sentence being input to a natural language processing model of the second neural network module, and encoded by the natural language processing model to extract semantics, so as to generate a second vector;
the goal type and the goal entity of the current dialogue sentence being input to a first Bi-directional Gated Recurrent Unit model of the second neural network module, and encoded by the first Bi-directional Gated Recurrent Unit model, so as to generate a third vector;
combining the second vector and the third vector to obtain a fourth vector;
the knowledge base data being input to a second Bi-directional Gated Recurrent Unit model of the second neural network module, and encoded by the second Bi-directional Gated Recurrent Unit model, so as to generate a fifth vector;
performing an attention mechanism operation on the fourth vector and the fifth vector to obtain a sixth vector;
combining the fifth vector and the sixth vector to obtain a seventh vector; and
the seventh vector being input to a single-layer neural network model of the second neural network module, and classified by the single-layer neural network model, so as to generate the reply sentence.

2. The man-machine dialogue method according to claim 1, wherein the current dialogue sentence is an initial dialogue sentence, and using the current dialogue sentence and a goal type and a goal entity obtained before the current dialogue sentence as an input of a first neural network module of a neural network system, and generating the goal type and the goal entity of the current dialogue sentence by performing feature extraction through the first neural network module, comprises:
using the current dialogue sentence and a preset goal type and a preset goal entity as the input of the first neural network module of the neural network system, and generating the goal type and the goal entity of the current dialogue sentence by performing feature extraction through the first neural network module.

3. The man-machine dialogue method according to claim 1, wherein using a current dialogue sentence and a goal type and the goal entity obtained before the current dialogue sentence as an input of a first neural network module of a neural network system, and generating the goal type and the goal entity of the current dialogue sentence by performing feature extraction through the first neural network module, comprises:
 using the current dialogue sentence as an input of a first iteration dilated convolutions neural network model of the first neural network module, and generating, by performing feature extraction through the first iteration dilated convolutions neural network model, a first vector representing whether a current dialogue goal is completed; and
 using the first vector and the goal type and the goal entity obtained before the current dialogue sentence as an input of a second iteration dilated convolutions neural network model of the first neural network module, and generating the goal type and the goal entity of the current dialogue sentence by performing feature extraction through the second iteration dilated convolutions neural network model.

4. The man-machine dialogue method according to claim 3, wherein
 generating, by performing feature extraction through the first iteration dilated convolutions neural network model, a first vector representing whether a current dialogue goal is completed comprises: performing feature extraction through the first iteration dilated convolutions neural network model, so as to generate, through a pooling layer of the first iteration dilated convolutions neural network model, the first vector representing whether the current dialogue goal is completed; and
 generating, the goal type and the goal entity of the current dialogue sentence by performing feature extraction through the second iteration dilated convolutions neural network model comprises: performing feature extraction through the second iteration dilated convolutions neural network model, so as to generate the goal type and the goal entity of the current dialogue sentence through a fully connected layer of the second iteration dilated convolutions neural network model.

5. The man-machine dialogue method according to claim 1, wherein before using the current dialogue sentence, the goal type and the goal entity of the current dialogue sentence and knowledge base data as an input of a second neural network module of the neural network system, and generating a reply sentence by performing feature extraction and classification through the second neural network module, the method further comprises:
 obtaining the neural network system by performing training with training data, wherein the training data comprises a dialogue sequence, candidate reply sentences, the knowledge base data, and a goal recommendation sequence, and the dialogue sequence comprises a chit-chat dialogue, a question answering dialogue, and a recommendation dialogue.

6. The man-machine dialogue method according to claim 5, wherein obtaining the neural network system by performing training with training data comprises:
 using user dialogue sentence in the dialogue sequence of the training data and the goal type and the goal entity obtained before the user dialogue sentence as an input of the first neural network module of the neural network system, and generating the goal type and the goal entity of the user dialogue sentence by performing feature extraction through the first neural network module; and
 using the user dialogue sentence, the goal type and the goal entity of the user dialogue sentence and the knowledge base data as an input of the second neural network module of the neural network system, and generating a first reply sentence by performing feature extraction and classification through the second neural network module.

7. The man-machine dialogue method according to claim 6, wherein the user dialogue sentence is an initial dialogue sentence, and using user dialogue sentence in the dialogue sequence of the training data and the goal type and the goal entity obtained before the user dialogue sentence as an input of the first neural network module of the neural network system, and generating the goal type and the goal entity of the user dialogue sentence by performing feature extraction through the first neural network module, comprises:
 using the user dialogue sentence and a preset goal type and a preset goal entity as the input of the first neural network module of the neural network system, and generating the goal type and the goal entity of the user dialogue sentence by performing feature extraction through the first neural network module.

8. The man-machine dialogue method according to claim 6, wherein using user dialogue sentence in the dialogue sequence of the training data and the goal type and the goal entity obtained before the user dialogue sentence as an input of the first neural network module of the neural network system, and generating the goal type and the goal entity of the user dialogue sentence by performing feature extraction through the first neural network module, comprises:
 using the user dialogue sentence as an input of a first iteration dilated convolutions neural network model of the first neural network module, and generating, by performing feature extraction through the first iteration dilated convolutions neural network model, a first vector representing whether a user dialogue goal is completed; and
 using the first vector and the goal type and the goal entity obtained before the user dialogue sentence as an input of a second iteration dilated convolutions neural network model of the first neural network module, and generating the goal type and the goal entity of the user dialogue sentence by performing feature extraction through the second iteration dilated convolutions neural network model.

9. The man-machine dialogue method according to claim 8, wherein
 generating, by performing feature extraction through the first iteration dilated convolutions neural network model, a first vector representing whether a user dialogue goal is completed comprises: performing feature extraction through the first iteration dilated convolutions neural network model, so as to generate, through a pooling layer of the first iteration dilated convolutions neural network model, the first vector representing whether the user dialogue goal is completed; and
 generating, the goal type and the goal entity of the user dialogue sentence by performing feature extraction through the second iteration dilated convolutions neural network model comprises: performing feature extraction through the second iteration dilated convolutions neural network model, so as to generate the goal type and the goal entity of the user dialogue sentence through a fully connected layer of the second iteration dilated convolutions neural network model.

10. The man-machine dialogue method according to claim 6, wherein using the user dialogue sentence, the goal type and the goal entity of the user dialogue sentence and knowledge base data as an input of the second neural network module of the neural network system, and generating a first reply sentence by performing feature extraction and classification through the second neural network module, comprises:
the user dialogue sentence and the first reply sentence back-propagated being input to a natural language processing model of the second neural network module, and encoded by the natural language processing model to extract semantics, so as to generate a second vector;
the goal type and the goal entity of the user dialogue sentence being input to a first Bi-directional Gated Recurrent Unit model of the second neural network module, and encoded by the first Bi-directional Gated Recurrent Unit model, so as to generate a third vector;
combining the second vector and the third vector to obtain a fourth vector;
the knowledge base data being input to a second Bi-directional Gated Recurrent Unit model of the second neural network module, and encoded by the second Bi-directional Gated Recurrent Unit model, so as to generate a fifth vector;
performing an attention mechanism operation on the fourth vector and the fifth vector to obtain a sixth vector;
combining the fifth vector and the sixth vector to obtain a seventh vector; and
the seventh vector being input to a single-layer neural network model of the second neural network module, and classified by the single-layer neural network model, so as to generate the first reply sentence.

11. A man-machine dialogue system, comprising a processor and a memory storing a computer program, wherein the computer program, when executed by the processor, causes the processor to:
obtain a current dialogue sentence input by a user;
use the current dialogue sentence and a goal type and a goal entity obtained before the current dialogue sentence as an input of a first neural network module of a neural network system, and generate the goal type and the goal entity of the current dialogue sentence through feature extraction through the first neural network module; and
use the current dialogue sentence, the goal type and the goal entity of the current dialogue sentence and knowledge base data as an input of a second neural network module of the neural network system, and generate a reply sentence through feature extraction and classification through the second neural network module,
wherein using the current dialogue sentence, the goal type and the goal entity of the current dialogue sentence and knowledge base data as an input of a second neural network module of the neural network system, and generating a reply sentence by performing feature extraction and classification through the second neural network module, comprises:
the current dialogue sentence being input to a natural language processing model of the second neural network module, and encoded by the natural language processing model to extract semantics, so as to generate a second vector;
the goal type and the goal entity of the current dialogue sentence being input to a first Bi-directional Gated Recurrent Unit model of the second neural network module, and encoded by the first Bi-directional Gated Recurrent Unit model, so as to generate a third vector;
combining the second vector and the third vector to obtain a fourth vector;
the knowledge base data being input to a second Bi-directional Gated Recurrent Unit model of the second neural network module, and encoded by the second Bi-directional Gated Recurrent Unit model, so as to generate a fifth vector;
performing an attention mechanism operation on the fourth vector and the fifth vector to obtain a sixth vector;
combining the fifth vector and the sixth vector to obtain a seventh vector; and
the seventh vector being input to a single-layer neural network model of the second neural network module, and classified by the single-layer neural network model, so as to generate the reply sentence.

12. The man-machine dialogue system according to claim 11, wherein the processor is further configured to:
in response to determining that the current dialogue sentence is an initial dialogue sentence, use the current dialogue sentence, a preset goal type and a preset goal entity as an input, and generate the goal type and the goal entity of the current dialogue sentence through feature extraction.

13. The man-machine dialogue system according to claim 11, wherein the processor is further configured to:
use the current dialogue sentence as an input, and generate a first vector representing whether a current dialogue goal is completed through feature extraction; and
use the first vector, the goal type and the goal entity of a preceding dialogue sentence obtained before the current dialogue sentence as an input, and generate the goal type and the goal entity of the current dialogue sentence through feature extraction.

14. The man-machine dialogue system according to claim 13, wherein the processor is further configured to:
generate, through a pooling layer of a first iteration dilated convolutions neural network model, the first vector representing whether the current dialogue goal is completed; and generate the goal type and the goal entity of the current dialogue sentence through a fully connected layer of a second iteration dilated convolutions neural network model.

15. A non-transitory computer-readable storage medium having a computer program stored thereon, wherein the program, when executed by a processor, implements operations comprising:
obtaining a current dialogue sentence input by a user;
using the current dialogue sentence and a goal type and a goal entity obtained before the current dialogue sentence as an input of a first neural network module of a neural network system, and generating the goal type and the goal entity of the current dialogue sentence by performing feature extraction through the first neural network module; and
using the current dialogue sentence, the goal type and the goal entity of the current dialogue sentence and knowledge base data as an input of a second neural network module of the neural network system, and generating a reply sentence by performing feature extraction and classification through the second neural network module, wherein using the current dialogue sentence, the goal type and the goal entity of the current dialogue sentence and knowledge base data as an input of a second neural network module of the neural network system, and generating a reply sentence by performing feature extraction and classification through the second neural network module, comprises:

the current dialogue sentence being input to a natural language processing model of the second neural network module, and encoded by the natural language processing model to extract semantics, so as to generate a second vector;

the goal type and the goal entity of the current dialogue sentence being input to a first Bi-directional Gated Recurrent Unit model of the second neural network module, and encoded by the first Bi-directional Gated Recurrent Unit model, so as to generate a third vector combining the second vector and the third vector to obtain a fourth vector;

the knowledge base data being input to a second Bi-directional Gated Recurrent Unit model of the second neural network module, and encoded by the second Bi-directional Gated Recurrent Unit model, so as to generate a fifth vector;

performing an attention mechanism operation on the fourth vector and the fifth vector to obtain a sixth vector;

combining the fifth vector and the sixth vector to obtain a seventh vector; and the seventh vector being input to a single-layer neural network model of the second neural network module, and classified by the single-layer neural network model, so as to generate the reply sentence.

* * * * *